United States Patent Office 2,861,075
Patented Nov. 18, 1958

2,861,075

β-LACTONE OF YOHIMBIC ACID

Patrick A. Diassi, Westfield, N. J., assignor to Olin Mathieson Chemical Corporation, New York, N. Y., a corporation of Virginia No Drawing. Application July 22, 1957
Serial No. 673,170

3 Claims. (Cl. 260—287)

This invention relates to a new compound, the β-lactone of yohimbic acid, and its method of preparation.

The new compound of this invention is the β-lactone of yohimbic acid, which may be represented by the structural formula

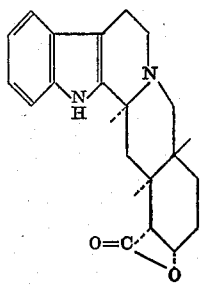

Surprisingly, this compound has been found to be physiologically active in that it possesses adrenolytic and hypotensive activity. Thus the compound of this invention can be used in lieu of known adrenolytic compounds such as phentolamine, 2-N[p'-tolyl-N-(m'-hydroxyphenyl)-aminomethyl]-imidazoline, in the treatment of peripheral vascular diseases, or the diagnosis of pheochromocytoma, for which purpose it is administered orally or parenterally in the same manner as phentolamine.

The β-lactone of yohimbic acid is prepared according to the process of this invention by interacting yohimbic acid with a chloroformate. The process is preferably conducted in the presence of an organic base, such a pyridine, in the cold (e. g., a temperature in the range of about $-10°$ C. to about $25°$ C.). Among the suitable chloroformates may be mentioned the lower alkyl esters (e. g., ethyl chloroformate, methyl chloroformate, propyl chloroformate and isobutyl chloroformate).

The following example illustrates the process of this invention:

To a solution of 500 mg. (1.47 millimoles) of yohimbic acid in 7.5 ml. of dry pyridine, there is added dropwise at $0°$ C. 0.42 ml. (4.41 millimoles) of ethyl chloroformate. The solution immediately turns orange-red and gassing is evident during the addition. A reddish gum separates which slowly redissolves as the temperature of the mixture is allowed to rise to room temperature. After standing overnight, the solution is poured into 25 ml. of water, whereupon needle-like crystals slowly separate. These are filtered, washed with water and recrystallized from ethanol. Yield about 175 mg. (37% theoretical), M. P. about 173–175° C.; $[\alpha]_D^{22}$ +11.6° (chloroform).

*Analysis.*—Calculated for $C_{20}H_{22}O_2N_2$ (322.40): C, 74.50; H, 6.88; N, 8.69. Found: C, 74.35; H, 6.88; N, 8.59. Equivalent weight (perchloric acid titration) 321. The ultra-violet spectrum in methanol exhibits maxima at 226 m$\mu$ (log $\epsilon$=4.52), 282 m$\mu$ (log $\epsilon$=3.89) and 290 m$\mu$ (log $\epsilon$=3.85). The infrared absorption spectrum in Nujol mull shows one band in the carbonyl stretching region at 5.55$\mu$.

The invention may be otherwise variously embodied within the scope of the appended claims.

What is claimed is:
1. The β-lactone of yohimbic acid.
2. A process for preparing the β-lactone of yohimbic acid, which comprises interacting yohimbic acid with lower alkyl chloroformate in the cold in the presence of pyridine and recovering the lactone formed.
3. The process of claim 2 wherein the chloroformate is ethyl chloroformate.

References Cited in the file of this patent

UNITED STATES PATENTS

| | | |
|---|---|---|
| 2,788,347 | MacPhillamy | Apr. 9, 1957 |
| 2,796,420 | Weisenborn | June 18, 1957 |